(12) United States Patent
Keränen

(10) Patent No.: US 12,607,457 B2
(45) Date of Patent: Apr. 21, 2026

(54) OPTICAL SENSOR APPARATUS

(71) Applicant: LMI TECHNOLOGIES INC., Burnaby (CA)

(72) Inventor: Heimo Keränen, Oulu (FI)

(73) Assignee: LMI TECHNOLOGIES INC., Burnaby (CA)

( * ) Notice: Subject to any disclaimer, the term of this patent is extended or adjusted under 35 U.S.C. 154(b) by 142 days.

(21) Appl. No.: 18/706,600

(22) PCT Filed: Mar. 9, 2023

(86) PCT No.: PCT/FI2023/050130
§ 371 (c)(1),
(2) Date: May 1, 2024

(87) PCT Pub. No.: WO2024/184576
PCT Pub. Date: Sep. 12, 2024

(65) Prior Publication Data

US 2026/0009635 A1 Jan. 8, 2026

(51) Int. Cl.
*G01B 11/24* (2006.01)
*G01N 21/55* (2014.01)

(52) U.S. Cl.
CPC ............. *G01B 11/24* (2013.01); *G01N 21/55* (2013.01)

(58) Field of Classification Search
CPC ..... G01B 11/24; G01B 11/2545; G01B 11/25; G01N 21/55
See application file for complete search history.

(56) References Cited

U.S. PATENT DOCUMENTS 6,674,572 B1 * 1/2004 Scheruebl .......... G02B 21/0024 356/392
2008/0031509 A1 2/2008 Heiden et al.
(Continued)

FOREIGN PATENT DOCUMENTS

WO 9844375 A2 10/1998

*Primary Examiner* — Tarifur R Chowdhury
*Assistant Examiner* — Carlos Perez-Guzman
(74) *Attorney, Agent, or Firm* — Stoel Rives LLP

(57) ABSTRACT

According to an example embodiment, an optical sensor apparatus (110) for determining at least one characteristic of a surface of an object (180) positioned within a measurement range is provided, the sensor apparatus (100) comprising: an illumination assembly (120) comprising one or more light sources (121, 121-*k*) arranged to emit light towards the measurement range through a light-collecting optical assembly, wherein the emitted light covers a predefined range of wavelengths and wherein the one or more light sources are arranged to form respective one or more light emitting area patterns of predefined lateral shape; a first optical assembly (140) arranged to longitudinally disperse the light emitted from the illumination assembly (120) such that light across the predefined range of wavelengths in each of the one or more light emitting area patterns is focused at a respective range of focus distances that constitutes a corresponding sub-range of candidate distances within the measurement range; a beam splitter (130) arranged to transmit the light emitted from the illumination assembly (120) towards the first optical assembly (140) and to fold the light reflected from the surface of the object (180) received through the first optical assembly (140); a second optical assembly (150) arranged to receive the folded light across the predefined range of wavelengths, to laterally disperse the received light across the predefined range of wavelengths and to focus the light across the predefined range of wavelengths at a predefined distance; a light sensor assembly (160) having a
(Continued)

sensor plane arranged at the predefined distance to receive the laterally dispersed light across the predefined range of wavelengths such that the light originating from the one or more light emitting area patterns is received at respective one or more corresponding sub-ranges of positions along an axis (y') on the sensor plane; and a detector assembly (170) arranged to determine the at least one characteristic of said surface of said object (180) based on the laterally dispersed light received across said one or more sub-ranges of positions along said axis (y') on the sensor plane.

18 Claims, 3 Drawing Sheets

(56) References Cited

U.S. PATENT DOCUMENTS

2010/0099984 A1* 4/2010 Graser ............... G02B 21/0032 356/610
2013/0050711 A1 2/2013 Ertl
2020/0174127 A1* 6/2020 Dietz ...................... G01S 17/46

* cited by examiner

OPTICAL SENSOR APPARATUS

RELATED APPLICATIONS

This application is a national stage under 35 U.S.C. § 371 of International Application No. PCT/FI2023/050130, filed Mar. 9, 2023, which is hereby incorporated by reference in its entirety.

TECHNICAL FIELD

The non-limiting examples and embodiments of the present invention relate to an optical sensor apparatus, which is useable e.g. for measuring one or more surface characteristics of an object, e.g. a distance to a surface of an object positioned within a measurement range of the sensor apparatus and/or optical characteristics of the surface of the object.

BACKGROUND

Optical displacement sensors that are suitable for measuring a distance to an object under study and/or a shape of the object under study known in the art apply various optical designs and techniques, where the most appropriate one may at least partially depend on requirements and intended application of a measurement instrument making use of the optical displacement sensor. Nevertheless, for example reliability and accuracy of the measurement results, relatively straightforward design and small size are typically general requirements for any optical displacement sensor to ensure its usage over a wide range of different applications, whereas any improvements in a design of an optical displacement sensor that facilitate providing improved accuracy and reliability of measurement without substantially increasing the size and/or complexity of the optical design and/or that facilitate providing uncompromised accuracy and reliability of measurement results while enabling smaller and/or simplified optical design are highly desirable.

SUMMARY

It is an object of the present invention to provide an optical sensor apparatus that exhibits relatively straightforward design and relatively small physical size while enabling measurements at high accuracy and reliability. It is a further object of the present invention to provide an optical measurement apparatus making use of such an optical sensor apparatus.

According to an example embodiment, an optical sensor apparatus for determining at least one characteristic of a surface of an object positioned within a measurement range is provided, the sensor apparatus comprising: an illumination assembly comprising one or more light sources arranged to emit light towards the measurement range through a light-collecting optical assembly, wherein the emitted light covers a predefined range of wavelengths and wherein the one or more light sources are arranged to form respective one or more light emitting area patterns of predefined lateral shape; a first optical assembly arranged to longitudinally disperse the light emitted from the illumination assembly such that light across the predefined range of wavelengths from each of the one or more light emitting area patterns is focused at a respective range of focus distances that constitutes a corresponding sub-range of candidate distances within the measurement range; a beam splitter arranged to transmit the light emitted from the illumination assembly towards the first optical assembly and to fold r the light reflected from the surface of the object received through the first optical assembly; a second optical assembly arranged to receive the folded light across the predefined range of wavelengths, to laterally disperse the received light across the predefined range of wavelengths and to focus the laterally dispersed light across the predefined range of wavelengths at a predefined distance; a light sensor assembly having a sensor plane arranged at the predefined distance to receive the laterally dispersed light across the predefined range of wavelengths such that the light originating from the one or more light emitting area patterns is received at respective one or more corresponding sub-ranges of positions along an axis on the sensor plane; and a detector assembly arranged to determine the at least one characteristic of said surface of said object based on the laterally dispersed light received across said one or more sub-ranges of positions along said axis on the sensor plane.

According to another example embodiment, an optical measurement apparatus for determining surface characteristics of an object positioned within a measurement range is provided, the measurement apparatus comprising an optical sensor apparatus according to the example embodiment described in the foregoing arranged to determine at least one characteristic of a surface of said object and a mechanism for changing relative positions of the sensor apparatus and the object, wherein the measurement apparatus is arranged to move the object with respect to the sensor apparatus to said plurality of positions according to a predefined movement pattern, operate the sensor apparatus to determine said at least one characteristic of the surface of the object at said plurality of positions, and determine said surface characteristics of said object based on the respective at least one characteristic of the surface of said object determined at said plurality of positions.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described in the following description of some embodiments may be provided in combinations other than those explicitly described unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 schematically illustrates an optical sensor apparatus according to an example.

DESCRIPTION OF SOME EMBODIMENTS

Figure 1:
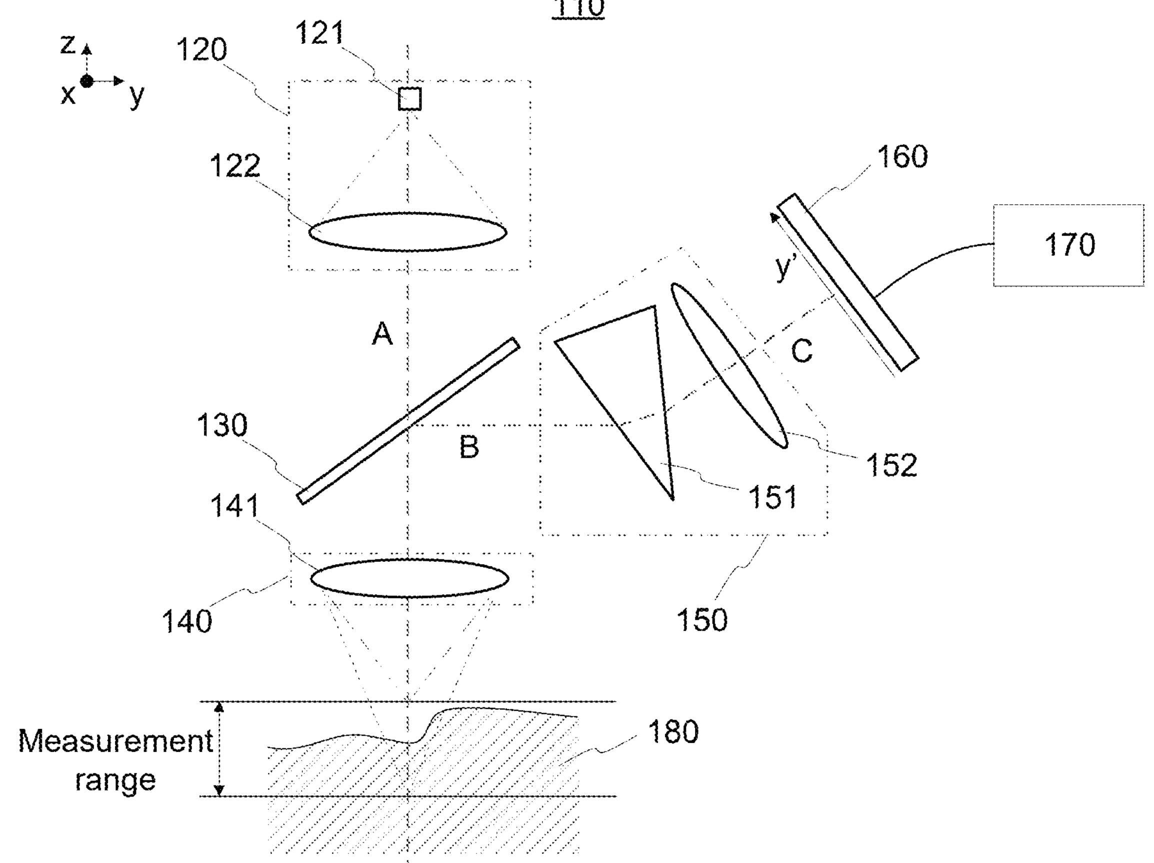
Figure 2:
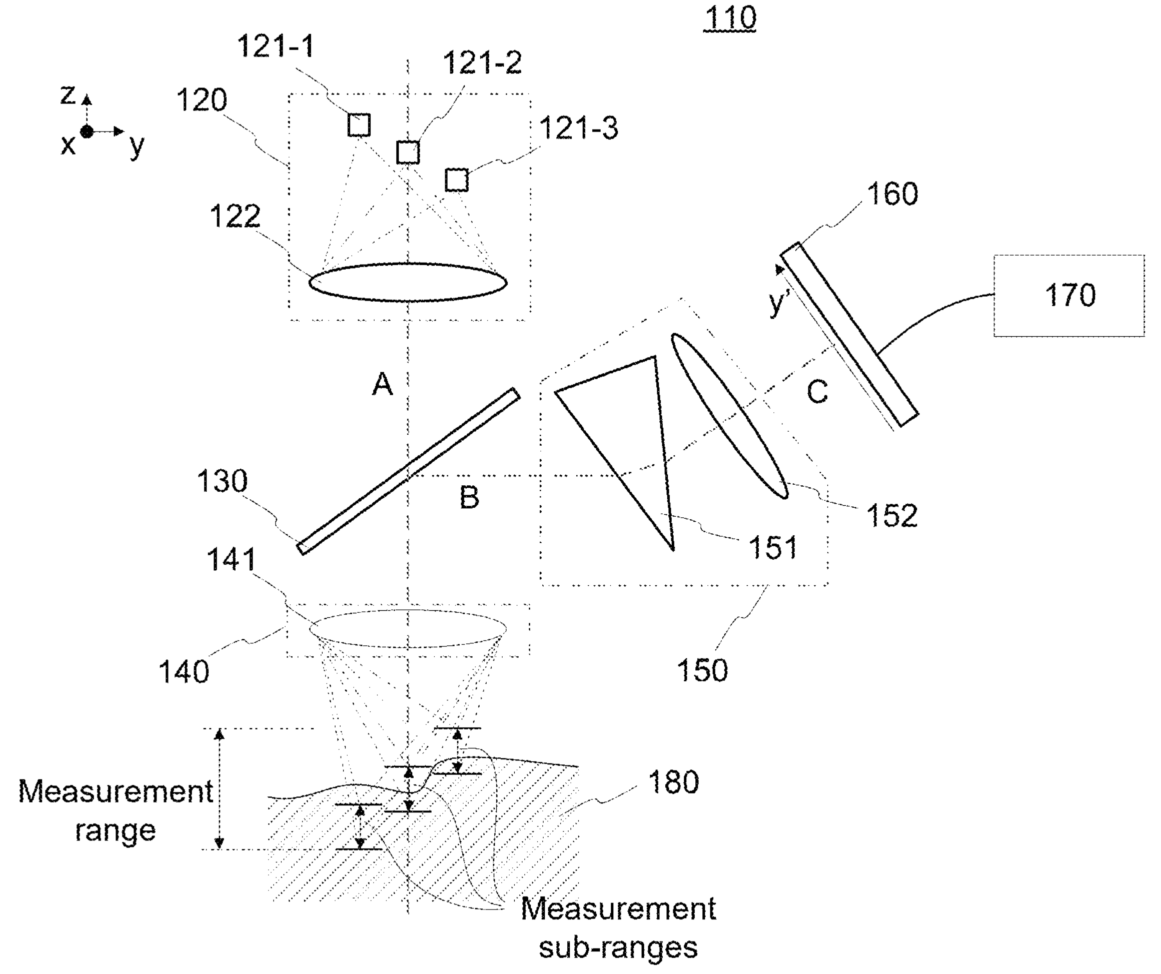
FIG. 2 schematically illustrates an optical sensor apparatus according to an example.

FIGS. 1 and 2 illustrate some elements of an optical sensor apparatus 110 according to respective examples.

Each of the illustrations of FIGS. 1 and 2 provides a schematic cross-section view to the respective elements of the optical sensor apparatus 110 while some of the elements are represented as respective blocks. In this regard, FIGS. 1 and 2 illustrate the optical sensor apparatus 110 with an illumination assembly 120, a beam splitter 130, a first optical assembly 140, a second optical assembly 150, a light sensor assembly 160 and a detector assembly 170. In the following, the optical sensor apparatus 110 is predominantly referred to, in short, as a sensor apparatus 110 for brevity and clarity of the description.

It is worth noting that the respective schematic illustrations of some elements of the optical sensor apparatus 110 provided in FIGS. 1 and 2 do not aim at accurately illustrating positions of these elements with respect to each other, respective sizes of these elements with respect to each other, or actual appearance of these elements while FIGS. 1 and 2 serve to illustrate at least some of those characteristics that are useful for describing certain aspects that pertain to the structure and operation of the sensor apparatus 110 according to the present disclosure.

The respective illustrations in FIGS. 1 and 2 are provided with an indication x, y and z directions that define a conceptual coordinate system that facilitates description of spatial relationships between the elements of the sensor apparatus 110 shown in FIGS. 1 and 2 as well as operational characteristics of some of the elements shown in FIGS. 1 and 2. In this regard in description of certain characteristics of the illumination assembly 120 and the first optical assembly 140, a plane defined by the x and y directions may be considered as a lateral direction, whereas the z direction may be considered as a longitudinal direction.

The sensor apparatus 110 may be applicable for determining at least one characteristic of a surface of an object 180 (temporarily) positioned within a measurement range of the sensor apparatus 110 based on light reflected from the surface of the object 180 that is brought within the measurement range. Examples of such characteristics to be measured via operation of the sensor apparatus 110 include a distance to the surface of the object 180 and/or an optical characteristic of the surface of the object 180, where the optical characteristic may include e.g. a reflectivity of the surface of the object 180. In the following, various characteristics pertaining to a structure and operation of the sensor apparatus 110 are described with refences to using the sensor apparatus 110 for determining a distance to the surface of the object 180 (temporarily) positioned within its measurement range (i.e. using the sensor apparatus 110 as an optical displacement sensor), whereas further examples of applicability of the sensor apparatus 110 are provided later in this text.

The distance to the surface of the object 180 positioned within the measurement range of the sensor apparatus 110 may be measured as a distance between a chosen reference plane and a position on the surface of the object 180 that resides within the measurement range of the sensor apparatus 110. Hence, the distance from the reference plane to the position on the surface of the object 180 is a measure in the longitudinal direction and it may be also referred to as a displacement with respect to the reference plane. The reference plane may comprise any longitudinal position that remains stationary with respect to the measurement range, for example a longitudinal position of an element of a measurement instrument or a measurement system employing the sensor apparatus 110 or a respective longitudinal position of an element of the sensor apparatus 110, e.g. the longitudinal position of the first optical assembly 140. The measurement range covers a range of candidate distances from the reference plane, whereas the position and depth of the measurement range depends at least on respective characteristics of the illumination assembly 120 and the first optical assembly 140. The concepts of the measurement range and the candidate distances within the measurement range are described in further detail in the following description of the sensor apparatus 110 according to the respective examples of FIGS. 1 and 2.

The illumination assembly 120 illustrated in the respective examples of FIGS. 1 and 2 comprises one or more light sources 121, 121-*k* and a light-collecting lens assembly 122 having its optical axis aligned with an axis A shown in the respective illustrations of FIGS. 1 and 2. The one or more light sources 121, 121-*k* are arranged to emit light that covers a predefined range of wavelengths and where the light sources 121, 121-*k* are arranged to form one or more light emitting area patterns of a predefined spatial shape, whereas the light emitted from the one or more light sources 121, 121-*k* may be transmitted through the light-collecting lens assembly 122 towards the measurement range. In this regard, wavelengths within the predefined range of wavelengths are those considered in measurements carried out via operation of the sensor apparatus 110. According to an example, the wavelengths conveyed in the light emitted from the illumination assembly 120 may be limited to the predefined range of wavelengths only, whereas in another example the light emitted from the illumination assembly 120 may include also wavelengths that are outside the predefined range. Some further characteristics of the one or more light sources 121, 121-*k* are described in the following after description of certain aspects of the elements of the sensor apparatus 110 illustrated in the respective examples of FIGS. 1 and 2.

In the example of FIG. 1 the illumination assembly 120 comprises a single light source 121 that is disposed at the axis A, thereby resulting in emission of light from a single light emitting area pattern of the predefined spatial shape. As an example in this regard, the single light source 121 may disposed at a focal plane of the light-collecting lens assembly 122, the illumination assembly 120 thereby transmitting collimated or substantially collimated light towards the measurement range. As an example, the lateral shape of the light emitting area pattern of the single light source 121 may comprise a point, which may be provided e.g. by directing light through a pinhole arranged at the focus plane of the light-collecting lens assembly 122 e.g. at the axis A. As another example, the lateral shape of the light emitting area pattern of the single light source 121 may comprise a line, which may be provided e.g. by directing light through a slit extending in the lateral direction (e.g. in the x direction) at the focus plane of the light-collecting lens assembly 122 e.g. such that the slit intersects the position of the axis A.

The illustration of FIG. 2 shows three light sources 121-1, 121-2, 121-3, which serves as an example that generalizes into two or more light sources 121-*k* that are disposed at respective positions with respect to the axis A and with respect to the focal plane of the light-collecting lens assembly 122, each arranged to emit light that covers the same predefined range of wavelengths (as described above for the single light source 121). In this regard, each of the two or more light sources 121-*k* preferably has a lateral position (i.e. a position with respect to the axis A) that is different from respective lateral positions of the other ones of the two or more light sources 121-*k* and a longitudinal position (e.g. a position with respect to the focal plane of the light-collecting lens assembly 122) that is different from respective longitudinal positions of the other ones of the two or more light sources 121-*k* in order to focus respective projections of the light emitting area patterns originating therefrom at different lateral and longitudinal positions in the measurement range. Consequently, the light emitted from the illumination assembly 120 is not fully collimated. The respective offsets from the axis A and from the focal plane are typically a fraction of the focus length of the light-collecting lens assembly 122. The relationship between the respective positions of the two or more light sources 121-*k* and their focusing within the measurement range is described in the following in further detail. In a particular example, the two or more light sources 121-*k* may be arranged at even spacing along an axis on a (conceptual) plane that has a non-zero tilt angle with respect to the focal plane of the light-collecting lens assembly 122 such that the arrangement of the two or more light sources 121-*k* is centered with respect to axis A.

As in the case of the single light source 121 according to the example of FIG. 1, also in the example of FIG. 2 the lateral shape of the respective light emitting area patterns of the two or more light sources 121-*k* may comprise e.g. a point or a line. In consideration of the example where the two or more light sources 121-*k* are arranged along the axis on the (conceptual) plane having the non-zero tilt angle with respect to the focal plane of the light-collecting lens assembly 122, respective light emitting area patterns may be provided e.g. by directing light through a (one-dimensional) pinhole array or a slit array that has a desired number of pinholes or slits at a desired spacing and that is arranged in the non-zero tilt angle with respect to the focal plane such that a line of pinholes or slits in the array is centered with respect to the axis A. The number of light emitting area patterns and their spacing may be chosen such that a lateral spacing and spread of their projections on the surface of the object 180 and, consequently, the lateral and longitudinal distribution of measurement sub-ranges arising therefrom result in a desired depth and lateral size of the measurement range (which will be described in the following). In non-limiting examples the diameter of a point of light or the width of a line light may be in a range from 5 to 30 micrometers (μm) and/or the spacing between the points or lines of light may be in a range from 350 to 1000 μm, e.g. 500 μm.

Respective positions of the two or more light sources 121-*k* may be selected in view of the distance between the illumination assembly 120 and the first optical assembly 140 and in view of the lateral size of the first optical assembly 140 such that the light from the two or more light emitting area patterns are focused by the first optical assembly 140 at respective lateral positions that are spaced apart from each other and hence the light from each of the two or more light emitting area patterns is projected on the surface of the object 180 positioned with the measurement range as respective distinct light intensity patterns that are laterally separated from the other light intensity patterns projected on the surface of the object 180. In view of the non-limiting examples regard the lateral shape of the light emitting area patterns described in the foregoing, for each wavelength the first optical assembly 140 may focus the light emitted from the illumination assembly 110 as a respective set of points or as a respective set of lines that are substantially evenly spaced in the lateral direction (e.g. in the y direction).

The light-collecting lens assembly 122 schematically illustrated in FIGS. 1 and 2 serves as an example of a light-collecting optical assembly and in other examples the light-collecting lens assembly 122 may be replaced by a light-collecting mirror assembly or by a light-collecting optical assembly comprising one or more lenses and one or more mirrors. Such modification of the optical arrangement that results in usage of a light-collecting optical assembly other than the light-collecting lens assembly 122 may require repositioning of the one or more light sources 121 with respect to the light-collecting optical assembly accordingly in order to provide the functionality assigned to the second optical assembly 150 and the light sensor assembly 160 in the sensor apparatus 110 according to the present disclosure.

The first optical assembly 140 may be positioned along the axis A such that it is able to receive the light emitted from the illumination assembly 120 and it is arranged to longitudinally disperse the light emitted from the illumination assembly 120 such that light across the predefined range of wavelengths from each the one or more light emitting area patterns is focused at a respective range of focus distances that constitute corresponding one or more sub-ranges of candidate distances within the measurement range. Due to its role in focusing the light emitted from the illumination assembly 120, the first optical assembly 140 may be also referred to as a focusing assembly. Herein and in the present disclosure in general, the expression 'across the predefined range of wavelengths' is applied to refer to wavelengths throughout the predefined range of wavelengths, i.e. to wavelengths covered by the predefined range of wavelengths.

The one or more sub-ranges of candidate distances arising from wavelength-dependent focusing characteristics of the first optical assembly 140 define the measurement range of the sensor apparatus 110 and they are referred to as 'candidate distances' since they set up a range of distances that are measurable via operation of the sensor apparatus 110 and hence one of the candidate distances may be identified as the one that represents the longitudinal position of the surface of the object 180 (temporarily) positioned within the measurement range. Consequently, in a scenario where the longitudinal position of the first optical assembly 140 serves as the reference plane for expressing the measured distance, the candidate distance that is found to represent the longitudinal position of the surface of the object 180 also directly indicates the distance measured via operation of the sensor apparatus 110 (i.e. the displacement of the surface of the object 180 with respect to the reference plane), whereas in a scenario where the reference plane is offset from the longitudinal position of the first optical assembly 140, the distance measured via operation of the sensor apparatus 110 may be found as a sum of the offset between the reference plane and the longitudinal position of the first optical assembly 140 and the candidate distance that is found to represent the longitudinal position of the surface of the object 180.

The first optical assembly 140 further serves as part of light collection optics: light reflected from the surface of the object 180 (temporarily) brought within the measurement range is transmitted through the first optical assembly 140 back towards the beam splitter 130, which folds the reflected light towards the second optical assembly 150 that introduces lateral dispersion to the folded light received thereat before passing the resulting laterally dispersed light for reception at a sensor plane of the light sensor assembly 160 such that the predefined range of wavelengths conveyed therein is distributed along an axis y' on the sensor plane. Transmission of the light reflected from the surface of the object 180 through the second optical assembly 150 and its reception at the sensor plane of the light sensor assembly 160 is described in the following in further detail.

According to an example, the first optical assembly 140 illustrated in the respective examples of FIGS. 1 and 2 comprises a first focusing lens assembly 141 that has its optical axis aligned with the axis A and that is arranged to introduce a predefined amount of a longitudinal chromatic dispersion that results in focusing the different wavelengths included in the light received from the illumination assembly 110 on the opposite side of the first focusing lens assembly 141 at respective wavelength-dependent (different) distances from the first focusing lens assembly 141. Characteristics of the first focusing lens assembly 141 may be chosen such that it provides a desired amount of longitudinal dispersion, where an applicable amount of longitudinal dispersion may be dependent e.g. on the predefined range of wavelengths in the light from the one or more light emitting area patterns of the one or more light sources 121, 121-*k* and/or on the desired depth and position of the measurement range created by the first optical assembly 140. The longitudinal chromatic dispersion may be also referred to as longitudinal chromatic aberration.

If considering such focusing characteristics for the light from a single light emitting area pattern of the example of FIG. 1, the longitudinal chromatic dispersion introduced by the first optical assembly 140 results in focusing different wavelengths of the light from the single light emitting area pattern at different focus distances from the first optical assembly 140 such that shorter wavelengths are focused at a shorter distance from the first optical assembly 140 than longer wavelengths. In the framework of the example of FIG. 1, the range of focus distances from a focus distance of the shortest wavelength of the predefined wavelength range to a focus distance of the longest wavelength of the predefined wavelength range defines a single sub-range of candidate distances and, consequently, also defines the available measurement range of the sensor apparatus 110.

Still referring to the scenario of the single light emitting area pattern, when using the sensor apparatus 110 according to the example of FIG. 1 to determine the distance to a position on the surface of the object 180 that is (temporarily) brought within the measurement range, the light emitted from the single light emitting area pattern is projected on the surface of the object 180 at a (lateral) measurement position that is aligned with the axis A and reflected from the surface of the object 180. In this regard, characteristics of reflected light are different at different wavelengths depending on the longitudinal position of the surface of the object 180 within the measurement range: a wavelength focused at a candidate distance that coincides with the surface of the object 180 results in reflecting a sharp image of the single light emitting area pattern, whereas (other) wavelengths focused at (other) candidate distances that do not coincide with the surface of the object 180 result in reflecting a blurred image of the single light emitting area pattern. In this regard, the extent of blurriness increases with increasing margin between a candidate distance at which a given wavelength is focused and the surface of the object 180. Consequently, the reflected light at the wavelength that is focused on the surface of the object 180 is received at the sensor plane of the light sensor assembly 160 at an intensity that is higher than respective intensities at those wavelengths that are not focused on the surface of the object 180, where the received light intensity decreases with increasing distance between the position of the surface of the object 180 and the focus distance of the respective non-focused wavelength.

Hence, in the example of FIG. 1 where the light from a single light emitting area pattern originating from the single light source 121 disposed at the axis A is applied to create a single measurement sub-range that also serves as the (overall) measurement range, the longitudinal position and the depth of the measurement range of the sensor apparatus 110 depend at least on the amount of longitudinal chromatic dispersion introduced by the first optical assembly 140 and on the predefined range of wavelengths considered in the measurement. In this regard, the single measurement sub-range provides a unique mapping between the wavelengths within the predefined range of wavelengths and the corresponding candidate distances. As an example of accounting for the above-described characteristics having an effect of the applicable measurement depth in the framework of the example of FIG. 1, the design of the sensor apparatus 110 may be based on calculations and/or simulations that proceed from defining a desired depth of the measurement range and selecting the predefined range of wavelengths to be considered in the measurement and/or the focusing characteristics of the first optical assembly 140 such that the desired depth of the measurement range is obtained.

Referring now to a scenario according to the example of FIG. 2 where the light from two or more (distinct) light emitting area patterns is emitted from the illumination assembly 120 and received at the first optical assembly 140, the aspect of focusing of the predefined range of wavelengths at a corresponding range of distances from the first optical assembly 140 to define a range of candidate distances and the aspect of the reflected light at the wavelength that is focused at a candidate distance that coincides with the surface of the object 180 being received at the sensor plane of the sensor assembly 160 at a relatively high intensity (in relation to reflections at other wavelengths) follow the logic described above for the light from each of the two or more light emitting area patterns separately, mutatis mutandis. In particular, in the framework of the sensor apparatus 110 according to the example of the FIG. 2 the first optical assembly 140 is arranged to longitudinally disperse the light received from the illumination assembly 120 such that the light across the predefined range of wavelengths from each of the two or more light emitting area patterns is focused at a corresponding range of distances from the first optical assembly 140 in a respective lateral measurement position, thereby defining a respective sub-range of candidate distances. The resulting two or more sub-ranges of candidate distances serve as respective two or more measurement sub-ranges located at the respective (lateral) measurement positions, whereas the two or more measurement sub-ranges jointly define the (overall) measurement range of the sensor apparatus 110.

Hence, in the example of FIG. 2 the two or more measurement sub-ranges are spatially distributed at different positions in the lateral direction, which may be referred to as (lateral) measurement positions or (lateral) measurement points depending on the lateral position of the light emitting area pattern of the light source 121-*k* from which the respective measurement sub-range originates. Moreover, the two or more measurement sub-ranges are also spatially distributed at different positions in the longitudinal direction depending on the longitudinal position of the light emitting area pattern of the light source 121-*k* (with respect to the focal plane of the light-collecting optical assembly of the illumination assembly 120) from which the respective measurement sub-range originates.

In a non-limiting example, the two or more measurement sub-ranges may be distributed within the measurement range as described in the following:

- Considering the lateral distribution of the measurement sub-ranges, light originating from a light source 121-*k* that is positioned on the axis A results in creating the respective measurement sub-range along the axis A, light originating from a light source 121-*k* disposed on a first side of the axis A results in creating the respective measurement sub-range in a lateral position that is on a second side of the axis A (that is opposite to the first side of the axis A), whereas light originating from a light source 121-*k* disposed on the second side of the axis A results in creating the respective measurement sub-range in a lateral position that is on the first side of the axis A.
- Considering the longitudinal distribution of the measurement sub-ranges, light originating from a light source 121-*k* disposed 'behind' the focal plane of the light-collecting optical assembly of the illumination assembly 120 (in terms of its distance to the first optical assembly 140) results in creating the respective measurement sub-range that is closer to the first optical assembly 140 than that created by a light source arranged on the focal plane of the light-collecting optical assembly, whereas light originating from a light source 121-*k* disposed 'in front of' the focal plane of the light-collecting optical assembly results in creating the respective measurement sub-range that is further away from the first optical assembly 140 than that created by a light source arranged on the focal plane of the light-collecting optical assembly.
- Respective light emitting area patterns of the light sources 121-*k* that are laterally offset from the axis A result in the first optical assembly 140 focusing different wavelengths at different distances from the axis A such that the offset of the focus point from the axis A increases with the distance of the light emitting area from the axis A. Consequently, the resulting measurement sub-range is defined via a range of focus points that is slightly inclined with respect to the axis A, thereby causing a 'drift' of the respective (lateral) measurement position further away from the axis A with increasing distance of the light emitting area from the axis A.

In view of the foregoing, since each of the two or more light sources 121-*k* emit light that conveys the same predefined range of wavelengths, each of the two or more measurement sub-ranges created based on positions of the respective light emitting area patterns of the respective ones of the two or more light sources 121-*k* provides a different mapping between the predefined range of wavelengths and the corresponding sub-range of candidate distances at a respective (lateral) measurement position. In particular, a first one of the two or more light sources 121-*k* that is disposed further away from the a light-collecting optical assembly of the illumination assembly 120 creates a measurement sub-range that covers shorter candidate distances than another measurement sub-range created by a second one of the two or more light sources 121-*k* that is disposed closer to the a light-collecting optical assembly, thereby providing a different mapping between the predefined range of wavelengths and the corresponding sub-range of candidate distances in the respective measurement sub-ranges created by the light from the respective light emitting area patterns of the first and second light sources 121-*k*.

If considering the two or more measurement sub-ranges arising from usage of the two or more light sources 121-*k* via the specific example of FIG. 2 that includes the three light sources 121-1, 121-2, 121-3, the relationship between the respective locations of the tree light sources 121-1, 121-2, 121-3 and the measurement sub-ranges created based on the light from the respective light emitting area patterns therefrom may be described in the following manner:

- The light source 121-2 may be disposed at the axis A at the focal plane of the light-collecting lens assembly 122 and, consequently, the longitudinal dispersion caused by the first optical assembly 140 results in focusing the predefined range of wavelengths conveyed in the light emitting area pattern originating from the light source 121-2 at a second measurement sub-range located at the axis A that covers a second sub-range candidate distances.
- The light source 121-1 may be disposed in a position that is 'behind' the focal plane of the light-collecting lens assembly 122 on the first side of the axis A and, consequently, the longitudinal dispersion caused by the first optical assembly 140 results in focusing the predefined range of wavelengths conveyed in the light emitting area pattern of the light source 121-1 at a first measurement sub-range at a (lateral) measurement position that is located on the second side of the axis A at a range of longitudinal positions that is closer to the first optical assembly 140 than the second measurement sub-range created based on the light emitting area pattern of the light source 121-2, the first measurement sub-range thereby covering a first sub-range candidate distances that includes candidate distances shorter than those of the second sub-range of candidate distances.
- The light source 121-3 may be disposed in a position that is 'in front of' the focal plane of the light-collecting lens assembly 122 on the second side of the axis A and, consequently, the longitudinal dispersion caused by the first optical assembly 140 results in focusing the predefined range of wavelengths conveyed in the light emitting area pattern of the light source 121-3 at a third measurement sub-range at a (lateral) measurement position that is located on the first side of the axis A at a range of longitudinal positions that is further away from the first optical assembly 140 than the second measurement sub-range created based on the light emitting area pattern of the light source 121-2, the third measurement sub-range thereby covering a third sub-range of candidate distances that are longer than those of the second sub-range of candidate distances.

Hence, in the example of FIG. 2 where the two or more light emitting area patterns of the respective two or more light sources 121-*k* disposed at different distances from the axis A and at different distances from the a light-collecting optical assembly are applied to create the respective measurement sub-ranges that jointly define the (overall) measurement range, the longitudinal position and the depth of the measurement range depend at least on the amount of longitudinal chromatic dispersion introduced by the first optical assembly 140, on respective positions of the two or more light sources 121-*k* with respect to the a light-collecting optical assembly, and on the predefined range of wavelengths considered in the measurement. These characteristics of the sensor apparatus 110 may be chosen such that the resulting two or more measurement sub-ranges exhibit a partial overlap with each in the longitudinal direction to ensure covering the (overall) measurement range without gaps. As an example, the design of the sensor apparatus 110 may involve at least partially experimental procedure that proceeds from defining a desired depth of the measurement range, followed by selecting respective positions of the two or more light sources 121-*k* and selecting the predefined range of wavelengths to be emitted from the two or more light sources 121-*k* and/or selecting the focusing characteristics of the first optical assembly 140 such that the desired depth of the measurement range is obtained.

The beam splitter 130 is positioned along the axis A between the illumination assembly 120 and the first optical assembly 140 and it is arranged to transmit the light emitted from the illumination assembly 120 towards the first optical assembly 140 and to fold the light reflected from the surface of the object 180 (temporarily) brought within the measurement range for transmission along an axis B. The beam splitter 130 may receive the reflected light along the axis A through the first optical assembly 140, which results in converting the light reflected from the surface of the object 180 from the longitudinally chromatically 'dispersed domain' back into to the 'non-dispersed domain' for further reflection from the beam splitter 130 towards the second optical assembly 150 along the axis B. Hence, the light originating from the illumination assembly 120 is directed towards the object 180 through the first optical assembly 140 along the axis A and the light reflected from the object 180 is collected through the first optical assembly 140 along the axis A, thereby providing a coaxial measurement arrangement.

The beam splitter 130 may comprise an applicable beam splitter known in the art, which is arranged to transmit a first portion of light directed thereto and reflect a second portion of the light directed thereto in both directions. In this regard, the first and second portions of light typically add up to 100%, whereas e.g. in beam splitter implementations that rely on a reflective coating deposited on an optical substrate a small amount of light may absorbed by the coating. As an example, each of the first and second portions may be substantially 50%, thereby providing the beam splitter 130 as a 50/50 beam splitter.

The second optical assembly 150 is arranged to receive light across the predefined range of wavelengths from the beam splitter 130 along the axis B, to laterally disperse the received light across the predefined range of wavelengths and to focus the laterally dispersed light across the predefined range of wavelengths at a predefined (focus) distance for reception by the light sensor assembly 160. Hence, the light received at the second optical assembly 150 may be transmitted in its entirety through the second optical assembly 150 and further to the light sensor assembly 160. The lateral dispersion introduced in the second optical subassembly 150 results in transmitting the light across the predefined range of wavelengths in the laterally dispersed form along an axis C towards the light sensor assembly 160 such that different wavelengths within the predefined wavelength range are focused at different lateral positions at the focus distance. In this regard, it is worth noting that in context of describing respective characteristics of the light folded by the beam splitter 130 and the laterally dispersed light, the concept of lateral direction is different from that applied in description of the illumination assembly 120 and the first optical assembly 140. In particular, in context of describing characteristics of the light folded by the beam splitter 130 the lateral direction comprises a direction across (e.g. substantially perpendicular to) the axis B, whereas in context of describing characteristics of the laterally dispersed light the lateral direction comprises a direction across (e.g. substantially perpendicular to) the axis C.

In the respective examples of FIGS. 1 and 2, the second optical assembly 150 comprises an arrangement of a dispersive prism 151 and a second focusing lens assembly 152, where the dispersive prism 151 is arranged to receive the light across the predefined range of wavelengths and introduce a predefined amount of lateral chromatic dispersion to the light received thereat from the beam splitter 130 and where the second focusing lens assembly 152 is arranged to focus the laterally dispersed light at the predefined (focus) distance. Characteristics of the dispersive prism 151 may be chosen such that it provides a desired amount of lateral dispersion, where an applicable amount of lateral dispersion may be dependent e.g. on the predefined range of wavelengths considered in the measurement and/or on the depth of the measurement range created by the first optical assembly 140.

Along the lines described above, the second optical assembly 150 and the dispersive prism 151 therein may receive the light folded by the beam splitter 130 substantially in its entirety and the light received at the second optical assembly 150 and the dispersive prism 151 therein may be likewise present substantially in its entirety in the laterally dispersed light provided as the output of the second optical assembly 150 for reception at the sensor plane of the light sensor assembly 160 (as described in the following in more detail). In other words, the second optical assembly 150 is arranged to transmit the light received from the beam splitter 130 therethrough substantially in its entirety for reception at the sensor plane of the sensor assembly 160. Hence, the second optical assembly 150 does not apply filtering to the light transmitted therethrough, whereas receiver optics typically applied in previously known solutions involve spatial filtering via focusing light received thereat to a receiver pinhole or a receiver slit, which results in passing through only those wavelengths of the received light that are in focus while substantially blocking those wavelengths that are out of focus. Omission of such spatial filtering in the second optical assembly 150 enables simplified and more affordable construction of the optical arrangement applied in the sensor apparatus 110 and facilitates straightforward tuning of respective positions and/or orientations of the elements of the sensor apparatus 110 with respect to each other.

The dispersive prism 151 schematically illustrated in FIGS. 1 and 2 serves as an example of a dispersive optical component, whereas in other examples the dispersive prism 151 may be replaced with another dispersive optical component or with an arrangement of two or more optical components that result in providing the desired amount of lateral dispersion to the light received thereat. Non-limiting examples of such other dispersive optical components include a transmission grating and a reflection grating. Usage of a dispersive optical component other than the dispersive prism 151 may require repositioning of second the focusing lens assembly 152 (or another focusing optical component or assembly) and/or the light sensor assembly 160 accordingly in order to provide the functionality assigned to the second optical assembly 150 and the light sensor assembly 160 in the sensor apparatus 110 according to the present disclosure.

The second focusing lens assembly 152 schematically illustrated in FIGS. 1 and 2 serves as an example of a focusing optical component or assembly and in other examples the second focusing lens assembly 152 may be replaced with another focusing optical assembly, such a focusing mirror assembly or a focusing optical assembly comprising one or more lenses and one or more mirrors. Usage of a focusing optical assembly other than the second focusing lens assembly 152 may require repositioning of the dispersive prism 151 (or another dispersive optical component) and/or the light sensor assembly 160 accordingly in order to provide the functionality assigned to the second optical assembly 150 and the light sensor assembly 160 in the sensor apparatus 110 according to the present disclosure.

In a further example, the dispersive optical component and the focusing optical component illustrated in the examples of FIGS. 1 and 2 as the dispersive prism 151 and the second focusing lens assembly 152, respectively, may be replaced with a single optical component or assembly that both provides the desired amount of lateral dispersion and carries out the focusing.

The light sensor assembly 160 has a sensor plane arranged at the predefined (focus) distance of the second optical assembly 150 to receive the laterally dispersed light from the second optical assembly 150 along the axis C. Along the lines described in the foregoing, the light across the predefined range of wavelengths conveyed in the folded light provided as input to the second optical assembly 150 and in the laterally dispersed light output from the second optical assembly 150 is received at the sensor plane. In this regard, the one or more light intensity patterns in the laterally dispersed light are spaced apart from each other in a similar manner as their projections on the surface of the object 180 and this spacing is retained also in their projections on the sensor plane. In particular, due to the lateral dispersion introduced in the second optical assembly 150, the sensor plane receives the light originating from the one or more light emitting area patterns at a respective one or more corresponding sub-ranges of positions along the axis y' on the sensor plane. Conversely, each of the one or more sub-ranges of positions along the axis y' on the sensor plane maps to the predefined range of wavelengths conveyed in the respective one of the one or more light emitting area patterns. According to an example, the axis y' on the sensor plane is aligned with the direction of lateral dispersion generated via operation of the second optical assembly 150, in other words the axis y' may be substantially parallel to the direction of lateral dispersion to ensure receiving the respective light originating from the one or more light emitting area patterns in the laterally dispersed format respective sub-ranges of positions along the axis y' that are spaced apart from each and hence do not overlap each other. In other examples, the axis y' may have a non-zero angle with the direction of lateral dispersion generated in the second optical assembly 150, where the angle between the axis y' and the direction of lateral dispersion is selected such that the respective light originating from the one or more light emitting area patterns received at respective sub-ranges of positions along the axis y' that do not overlap each other on the sensor plane.

Along the lines described in the foregoing, (in scenarios according to the example of FIG. 2) the light from each of the one or more light emitting area patterns of the illumination assembly 120 results in creation of the respective measurement sub-range where the mapping from the predefined range of wavelengths to the corresponding sub-range of candidate distances is different from that of the other measurement sub-ranges and, consequently, the applicable mapping between the predefined range of wavelengths and the corresponding sub-range of candidate distances within the measurement range is different from one sub-range of positions along the axis y' on the sensor plane to another. In other words, there is a respective predefined mapping from the predefined sub-range of positions along the axis y' on the sensor plane to the corresponding sub-range of candidate distances within the measurement range for each of the one or more sub-ranges of positions along the axis y' on the sensor plane (that receives the laterally dispersed light originating from the respective one of the one or more light emitting area patterns), which mapping depends on the spatial arrangement of the optical components of sensor apparatus 110.

In the example of FIG. 1 that makes use of the single light emitting area pattern for the measurement, the laterally dispersed light originating from the single light emitting area pattern is received at the sensor plane in a single sub-range of positions along the axis y', whereas the distance to the surface of the object 180 at the location of the single (lateral) measurement position may be identified based on an intensity of light received at the sensor plane as a function of a position across the single sub-range of positions along the axis y' on the sensor plane. Each position within the single sub-range of positions along the axis y' maps to a corresponding wavelength of the predefined range of wavelengths via a predefined mapping, whereas each wavelength of the predefined range of wavelengths maps to the corresponding candidate distance within the measurement range. Along the lines described in the foregoing, a single wavelength of the longitudinally dispersed light originating from the single light emitting area pattern that is focused by the first optical assembly 140 at a candidate distance that coincides with the surface of the object 180 at the location of the single (lateral) measurement position provides a sharp image of the light emitting area pattern on the sensor plane, whereas other wavelengths that are not focused at said candidate distance do not provide a sharp image of the light emitting area pattern on the sensor plane. Consequently, the sensor plane position within the single sub-range of positions along the axis y' on the sensor plane that receives the light conveyed in the light originating from the single light emitting area pattern at the highest intensity is the one that maps to the candidate distance that coincides with position of the surface of the object 180 at the location of the single (lateral) measurement position and that hence defines the distance to the surface of the object 180. In this regard, at least the following scenarios may be considered:

- there is no (local) intensity maximum that constitutes a peak in a light intensity across the single sub-range of positions along the axis y', which suggests absence of the surface of the object 180 within the measurement range;
- there is a (local) intensity maximum that constitutes a peak in the light intensity across the single sub-range of positions along the axis y', which suggests presence of the surface of the object 180 within the measurement range at the candidate distance that maps (via the corresponding wavelength) to the position of the intensity maximum within the single sub-range along the axis y'.

In the example of FIG. 2 that makes use of the two or more light emitting area patterns for the measurement, the respective light originating from the two or more light emitting area patterns is received at the sensor plane in respective two or more sub-ranges of positions along the axis y', whereas the distance to the surface of the object 180 at the location of the respective (lateral) measurement position may be identified based on an intensity of light received at the sensor plane as a function of a position across the respective one of the two or more sub-ranges of positions along the axis y' on the sensor plane. In each of the two or more sub-ranges of positions along the axis y', each position maps to a corresponding wavelength of the predefined range of wavelengths via the respective predefined mapping that pertains to the respective sub-range of positions, whereas each wavelength of the predefined range of wavelengths maps to a corresponding candidate distance within the respective measurement sub-range via the respective predefined mapping that pertains to the respective measurement sub-range. Along the lines described in the foregoing, the wavelength of the respective longitudinally dispersed light originating from each of the two or more light emitting area patterns that is focused by the first optical assembly 140 at a candidate distance that coincides with the surface of the object 180 at the location of the respective (lateral) measurement position provides a sharp image of the reflected light that results in the sensor plane receiving the reflected light at a higher intensity in comparison to the other wavelengths focused at candidate distances that do not coincide with the surface of the object 180. Consequently, the sensor plane positions across the two or more sub-ranges of positions along the axis y' on the sensor plane that receive the light conveyed in the light originating from the two or more light emitting area patterns at the highest intensity are the ones that map to the candidate distance(s) that coincide with the position of the surface of the object 180 at the respective one of the two or more (lateral) measurement position and that hence define the respective distances to the surface of the object 180 at the respective (lateral) measurement positions. In this regard, at least the following scenarios may be considered:

- there are no (local) intensity maxima constituting peaks in a light intensity across the two or more sub-ranges of positions along the axis y', which suggests absence of the surface of the object 180 within the measurement range;
- there is a single (local) intensity maximum that constitutes a peak in the light intensity within one of the two or more sub-ranges of positions along the axis y', which suggests presence of the surface of the object 180 within the measurement range in the respective (lateral) measurement position at the candidate distance that maps (via the corresponding wavelength) to position of the single local intensity maximum within the respective one of the two or more sub-ranges of positions along the axis y';
- there are two or more local intensity maxima that constitute respective peaks in the light intensity within respective ones of the two or more sub-ranges of positions along the axis y', which suggests presence of the surface of the object 180 within the measurement range in respective two more (lateral) measurement positions at the respective candidate distances that map (via the corresponding wavelengths) to respective positions of the two or more local intensity maxima within the respective ones of the two or more sub-ranges of positions along the axis y'.

In the above scenarios, the one that involves detecting presence of the surface of the object 180 based on the single (local) intensity maximum may appear e.g. when measuring a substantially non-transparent surface that is substantially planar and substantially aligned with the measurement range or has only a minor inclination with respect to the measurement range, whereas the one that involves detecting presence of the surface of the object 180 based on the two or more local intensity maxima may appear e.g. when measuring a substantially planar surface that has a large inclination with respect to the measurement range or when measuring a non-planar surface regardless of its orientation with respect to the measurement range.

The light sensor assembly 160 may be embodied as a line sensor or as a pixel sensor known in the art. As a non-limiting example in this regard, the sensor assembly 160 may comprise an image sensor, such as a charge coupled device (CCD) sensor or a complementary metal-oxide semiconductor (CMOS) sensor.

The detector assembly 170 is arranged to determine the distance to the surface of the object 180 based on one or more local intensity maxima of the laterally dispersed light across the one or more sub-ranges of positions along the axis y' on the sensor plane. Along the lines described in the foregoing, presence of the surface of the object 180 within the measurement range may be detectable based one or more (local) intensity maxima of the laterally dispersed light across the one or more sub-ranges of positions along the axis y'. In particular, the distance to the surface of the object 180 may be determined based on those one or more candidate distances that respectively map to respective one or more positions of the local intensity maxima of the laterally dispersed light along the axis y' on the sensor plane. As an example in this regard, the detector assembly 170 may be arranged to determine the distance via the following procedure that involves identifying the respective positions of the one or more local intensity maxima across said one or more sub-ranges of positions along said axis (y') on the sensor plane, and carrying out the following for each of the one or more identified positions:

- identify the respective sub-range of positions along said axis y' within which the respective identified position resides,
- select from respective predefined mappings between the respective sub-range of positions along said axis y' and a corresponding sub-range of candidate distances the one that pertains to the respective identified sub-range of positions, and
- apply the selected predefined mapping to identify that one of the candidate distances that corresponds to a (relative) position of the respective identified position within the identified sub-range of positions, thereby determining the distance to the surface of the object 180 at the respective (lateral) measurement position.

Along the lines described in the foregoing, in the example of FIG. 1 that results in directing the laterally dispersed light originating from the single light emitting area pattern to the single sub-range of positions along the axis y' the applicable mapping between the sub-range of positions along the axis y' and the corresponding sub-range of candidate distances is the same regardless of the position along the axis y' (in other words, the identification of the sub-range of positions along the axis y' within which the intensity maximum resides is implicit). In the example of FIG. 2 that results in directing the laterally dispersed light originating from the two or more light emitting area patterns to the respective two or more sub-ranges of positions along the axis y', determination of the distance may involve first identifying the sub-range of positions along the axis y' within which the intensity maximum resides and determining the candidate distance via application of the respective mapping that pertains to the identified sub-range of positions along the axis y'.

The detector assembly 170 may be embodied as an apparatus that comprises a processor and a memory, where the memory is arranged to store computer program code that, when executed by the processor, implements operation of the detector assembly 170 according to the present disclosure.

Figures 3A, 3B:
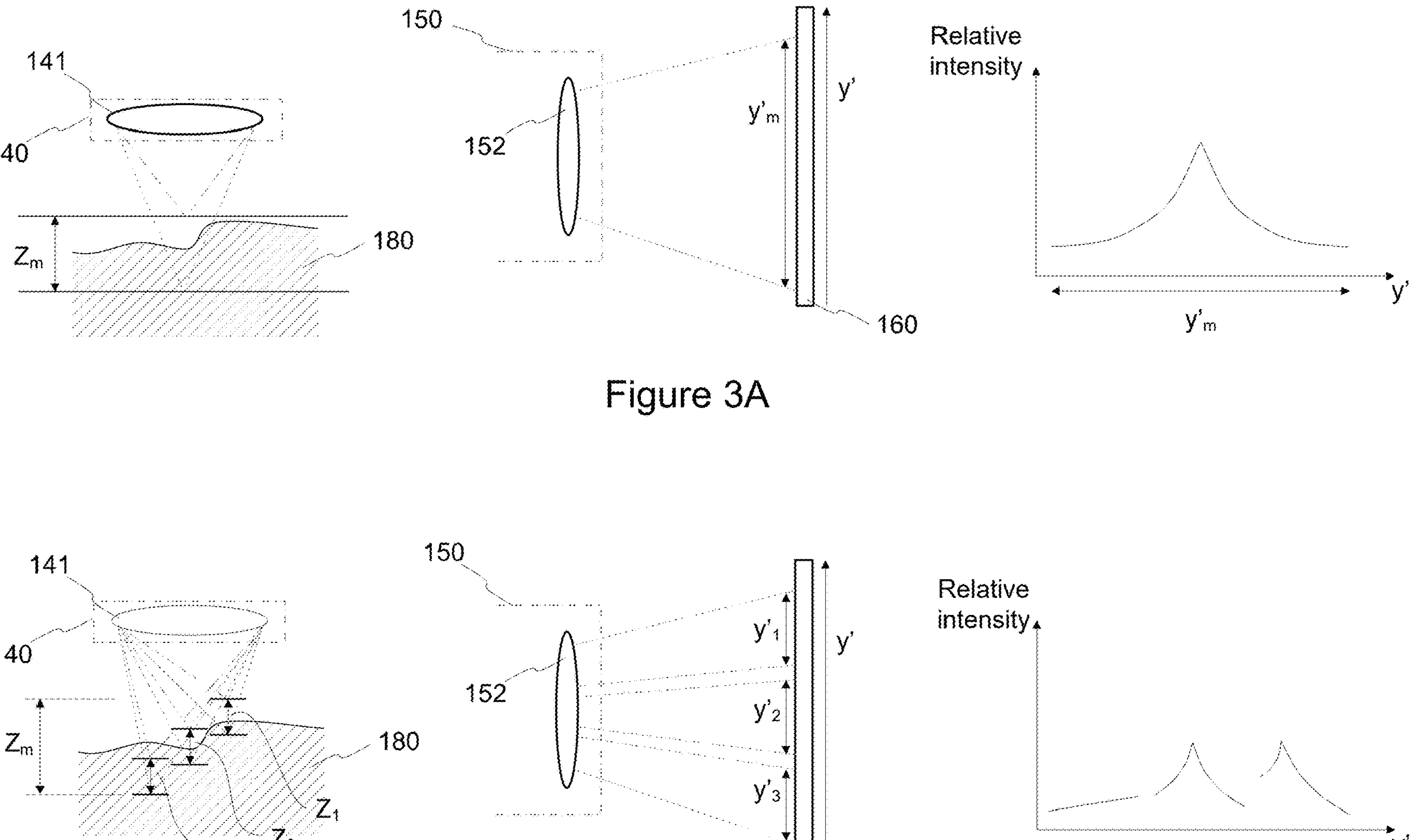
FIG. 3A schematically illustrates some aspects of distance measurement according to an example.
FIG. 3B schematically illustrates some aspects of distance measurement according to an example.

FIG. 3A schematically illustrates mapping between a sub-range of positions along the axis y' on the sensor plane according to a non-limiting example in the framework of the example of FIG. 1. In this regard, FIG. 3A illustrates a scenario that involves usage of the single light source 121 to provide the single light emitting area pattern in order to create the single measurement sub-range $Z_m$ in a single (lateral) measurement position (the illustration on the left). Due to the lateral dispersion introduced in the second optical assembly 150, the predefined range of wavelengths of the laterally dispersed light are distributed over the sub-range of positions $y'_m$ along the axis y' on the sensor plane (the illustration in the middle). Along the lines described in the foregoing, the sharp image of the reflected light at the wavelength focused at the candidate distance that coincides with the surface of the object 180 results in the sensor plane receiving the reflected light at a relatively high intensity in comparison to the received light intensity at those wavelengths that are focused at candidate distances that do not coincide with the surface of the object, where the intensity of the received light at the sensor plane gradually decreases with increasing distance between a non-coinciding candidate distance and the surface of the object 180. Consequently, the light intensity as a function of a position over the sub-range of positions $y'_m$ along the axis y' on the sensor plane may represented as a curve that indicates a (local) intensity maximum that constitutes a peak in the light intensity along the axis y' at a position of the single sub-range of positions $y'_m$ that maps to the candidate distance that coincides with the surface of the object 180 at the single (lateral) measurement position (the illustration on the right).

FIG. 3B schematically illustrates mapping between a sub-range of positions along the axis y' on the sensor plane according to a non-limiting example in the framework of the example of FIG. 2. In this regard, FIG. 3B illustrates a scenario that involves usage of the three light sources 121-1, 121-2, 121-3 to provide the respective three light emitting area patterns in order to create the respective three measurement sub-ranges $Z_1$, $Z_2$, $Z_3$ in respective three (lateral) measurement positions (the illustration on the left). Due to the lateral dispersion introduced in the second optical assembly 150, the predefined range of wavelengths conveyed in the light from the respective three light emitting area patterns reflected from the measurement sub-ranges $Z_1$, $Z_2$, $Z_3$ are distributed over the respective sub-ranges of positions $y'_1$, $y'_2$, $y'_3$ along the axis y' on the sensor plane (the illustration in the middle). In the example of FIG. 3B the light intensity as a function of a position within a respective one of the sub-ranges of positions $y'_1$, $y'_2$, $y'_3$ may be a piecewise curve over each of the three sub-ranges of positions $y'_1$, $y'_2$, $y'_3$, which indicates a (local) intensity maximum that constitutes a peak in the light intensity at a position within the sub-range of positions $y'_2$ that maps to the candidate distance that coincides with the surface of the object 180 at the respective one of three (lateral) measurement positions (the illustration on the right).

According to an example, the one or more light sources 121, 121-*k* are arranged to emit the light across the predefined range of wavelengths at substantially uniform radiant power to ensure that the radiant power of respective reflections of the one or more light emitting area patterns from the surface of the object 180 (temporarily) positioned within the measurement range is substantially independent of the wavelength within the predefined range, thereby allow for determination of the distance to the object 180 within the measurement range via a direct comparison of the respective light intensities across the one or more sub-ranges of positions along the axis y' on the sensor plane. In another example, the radiant power of the emitted light may vary over the predefined range of wavelengths, whereas in such an approach the detector assembly 170 is arranged to account for the wavelength-dependency of the radiant power in the light conveyed in the one or more light emitting area patterns originating from the illumination assembly 120 in identifying the intensity maximum across the one or more sub-ranges of positions along the axis y' on the sensor plane to ensure correctly identifying the sensor-plane-position that corresponds to the candidate distance that coincides with the surface of the object 180 positioned therein.

In consideration of the applicable predefined range of wavelengths in the respective examples of FIGS. 1 and 2, in the example of FIG. 1 a relatively wide range of wavelengths is required in order to ensure the measurement range that is deep enough for the intended operation and purpose of the sensor apparatus 110. As non-limiting examples in this regard, in the example of FIG. 1 the predefined range of wavelengths may span over a band having a width from 10 to 150 nm and it may cover a selected sub-range of visible wavelengths (i.e. from approximately 400 to 700 nm). Usage of the single light source 121 may be advantageous since it enables relatively straightforward design in terms of arrangement of the optical components of the sensor apparatus 110 via requiring only consideration of the reflection of the light from the single light emitting area pattern from the single measurement sub-range. Moreover, the single light source 121 may be disposed on the focal plane of the light-collecting optical assembly of the illumination assembly 120, thereby emitting the single light emitting area pattern as substantially collimated light that is also substantially collimated upon reception at the dispersing optical component of the second optical assembly 150, which ensures sharp focusing of the laterally dispersed light on the sensor plane.

In the example of FIG. 2 a relatively narrow range of wavelengths is sufficient due to usage of a plurality of light sources 121-*k* to create a respective plurality of measurement sub-ranges at different candidate distances within the measurement range. As a non-limiting example in this regard, in the example of FIG. 2 the predefined range of wavelengths may span over a band having a width in a range from 10 to 50 nm, e.g. 25 nm and it may cover a preselected sub-range of visible wavelengths, chosen e.g. from a sub-range from 420 to 480 nm. In a non-limiting example, the predefined range of wavelengths may cover a bandwidth of 25 nm from 425 nm to 450 nm (i.e. violet and/or blue light). In this regard, usage of any relatively narrow bandwidth facilitates provision of the substantially uniform radiant power across the applied range of wavelengths while the usage of the violet-blue spectrum is advantageous in that light emitting diodes (LEDs) that provide a relatively high radiant power at this range of wavelengths are readily available for use as the two or more light sources 121-*k*. While the plurality measurement sub-ranges arising from application of the plurality of light sources 121-*k* may introduce some further complexity in fine-tuning the arrangement of the optical components of the sensor apparatus 110, it enables providing a measurement range of increased measurement depth using a relatively narrow bandwidth in the light emitted from the illumination assembly 110.

Usage of the relatively narrow bandwidth provides a further advantage in terms of simplified and/or more affordable optical design via usage of simpler optical components and/or less expensive glass materials in comparison to a design that makes use of a relatively broad bandwidth. Moreover, a further advantage of the relatively narrow bandwidth arises from operation of second optical assembly 150: as described in the foregoing, usage of the two or more light sources 121-*k* to provide the light from the respective two or more light emitting area patterns results in the illumination assembly 120 emitting light that is not fully collimated and reception of such less than fully collimated light at the dispersing optical component of the second optical assembly 150, whereas the relatively narrow bandwidth nevertheless ensures sufficiently sharp focusing of the laterally dispersed light on the sensor plane to enable detection of the local intensity maxima along the axis y' on the sensor plane.

The sensor apparatus 110 described in the foregoing may be employed as a component of a measurement instrument or a measurement system that is applicable for measuring one or more aspects or characteristics of a shape of the surface of the object 180 via operating the sensor apparatus 110 to measure respective distances to multiple positions on the surface of the object 180, thereby capturing data that may be descriptive of the shape of the surface of the object 180. As an example in this regard, the measurement instrument or the measurement system may comprise respective mechanisms for moving the object 180 to a plurality of different measurement positions with respect to the sensor apparatus 110 according to a predefined movement pattern and for operating the sensor apparatus 110 to measure the distance to the surface of the object 180 at the plurality of different measurement positions. In another example, the measurement instrument or the measurement system may have respective mechanisms for moving the sensor apparatus 110 to the plurality of different measurement positions with respect to the object 180 according to the predefined movement pattern and for operating the sensor apparatus 110 to measure the distance to the surface of the object 180 at the plurality of different measurement positions.

Hence, the measurement instrument or the measurement system may be applied to scan an area on the surface of the object 180 and use the measured distances obtained during the scanning process to derive a three-dimensional (3D) map of the shape of the surface of the object 180. In this regard, the movement pattern may define a step-by-step movement through the plurality of positions that cover the area to be scanned via scanning parameters that define the step sizes, the step directions and predefined timing between consecutive steps for the scanning, whereas the measurement apparatus or the measurement system may derive the 3D map based on knowledge of the scanning parameters and respective distances measured at plurality of positions. The measurement apparatus or the measurement system may further apply knowledge of the lateral and longitudinal positions of the one or more measurement sub-ranges and the light intensity across the one or more sub-ranges of positions along the axis y' on the sensor plane captured via operation of the detector portion 170 in derivation of the 3D map. The movement pattern is preferably designed in view of the lateral distribution of the one or more measurement sub-ranges of the sensor apparatus 110 such that it guarantees measuring the respective distance to the surface of the object 180 in each of the plurality of positions at least once. As an example in this regard, in scenarios where the measurement relies on multiple measurement sub-ranges at respective lateral measurement positions, the movement pattern may involve scanning steps of sufficiently small step size at least in the y direction to ensure covering all desired measurement points on the surface of the object 180 in the y direction.

In the foregoing, the operation of the sensor apparatus 110 and its application as part of the measurement apparatus or the measurement system has been implicitly described with reference to measuring the distance to a single surface of the object 180 that is (temporarily) positioned within the measurement range, which in practice implies measurement of the distance to an outer surface of the object 180 (i.e. the surface of the object 180 that is facing the first optical sub-assembly 140). However, in an exemplifying variation of the sensor apparatus 110 according to the examples of FIGS. 1 and 2 may be applied to determine respective distances to the outer surface of the object and another surface (e.g. an embedded surface) that is below the outer surface, provided that the material of the object 180 between the outer surface and the other surface is transparent to light at the predefined range of wavelengths applied for measurement by the sensor apparatus 110. This may enable, for example, determining a thickness of a (transparent) coating layer provided as the outermost layer on the surface of the object 180 or determining a thickness of a (transparent) film provided as the object 180 for measurement via operation of the sensor apparatus 110.

The optical arrangement of the sensor apparatus 110 including the illumination assembly 120, the beam splitter 130, the first optical assembly 140, the second optical assembly 150 and the sensor assembly 160 is applicable for such measurement of respective distances to the two surfaces of the object 180 as such, whereas the (possible) presence of the other surface embedded under the outer surface may be taken into account in operation of the detector assembly 170. In this regard, both the outer surface and the other surface of the object 180 result in a respective peak in the received light intensity on the sensor plane that correspond to the respective candidate distances that coincide with these two surfaces of the object 180 at the respective (lateral) measurement positions and they may appear as respective local intensity maxima in the laterally dispersed light captured at the sensor plane of the sensor assembly 160.

In a scenario according to the example of FIG. 1 that applies the single light emitting area pattern, the respective intensity maxima arising from the outer surface and the other surface of the object 180 may appear as respective local intensity maxima within the single sub-range of positions along the axis y', which makes them readily recognizable as respective reflections arising from two different surfaces of the object 180 even without a significant difference in the respective magnitudes of these two local intensity maxima. Consequently, the respective candidate distances that correspond to the respective positions of these two local intensity maxima may be found based on their respective positions within the single sub-range of positions via usage of the mapping(s) described in the foregoing, whereas the shorter of the two distances implicitly pertains to the outer surface of the object 180 and the longer of the two distances pertains to the other surface of the object 180. In a scenario according to the example of FIG. 2 that applies the two or more light emitting area patterns, the respective intensity maxima arising from the outer surface and the other surface of the object 180 may appear as respective local intensity maxima within the same sub-range of positions along the axis y' or at different sub-ranges of positions along the axis y'. Consequently, as in the scenario with the single light emitting area pattern, also in this scenario the respective candidate distances that correspond to the respective positions of these two local intensity maxima may be found based on their respective positions within the respective ones of the two or more sub-ranges of positions along the axis y' via usage of the respective mapping(s) described in the foregoing.

The variant of the sensor apparatus 110 that is arranged for measuring the respective distances to the two surfaces of the object 180 may be applied as an element of a measurement apparatus or a measurement system along the lines described in the foregoing, mutatis mutandis. In particular, usage of such variant of the sensor apparatus 110 may enable e.g. measuring the thickness of a coating provided as the outermost layer of the object 180 or the thickness of a film provided as the object 180 via derivation of the 3D map of a kind described in the foregoing based on the respective distances to the outer layer and the other layer of the object 180 at the plurality of measurement positions.

In further examples, operation of the sensor apparatus 110 generalizes into measuring at least one characteristic of the surface of the object 180 (temporarily) positioned within the measurement range, where the at least one characteristic of the surface may involve respective positions of the one or more surfaces of the object 180 positioned within the measurement range or one or more optical characteristics of the surface of the object 180 positioned within the measurement range. In this regard, as another exemplifying variation of the sensor apparatus 110 according to the examples of FIGS. 1 and 2, the operation of the detector assembly 170 may involve using the light intensity as a function of a position along the axis y' on the sensor plane of the sensor assembly 160 directly as an indication of reflectivity or gloss of the (outer) surface of the object 180 (temporarily) positioned within the measurement range, e.g. such that the reflectivity or gloss is determined based on respective magnitudes of one or more local intensity maxima along the axis y'. When using such variant of the sensor apparatus 110 as an element of a measurement apparatus or a measurement system of the kind described in the foregoing for scanning the surface of the object 180, this results in providing a high-precision two-dimensional (2D) map of the surface of the object 180, which serves as a 2D image that is in (substantially perfect) focus throughout despite any variations in the shape of the surface in the longitudinal direction (i.e. in the z direction along the axis A). Such 2D imaging of the object 180 may serve as a reconstruction of any text and/or patterns provided on the surface of the object 180.

The sensor apparatus 110 described in the foregoing via references to the respective examples of FIGS. 1 and 2 as well as its exemplifying variations described in the foregoing may be (further) varied in a number of ways without departing from the scope of the sensor apparatus 110 according to the present disclosure. As an example in this regard, the sensor apparatus 110 may include one or more elements that are not depicted the respective illustrations of FIGS. 1 and 2, one or more elements that are depicted in the respective illustrations of FIGS. 1 and 2 may be omitted, and/or one or more elements depicted in the respective illustrations of FIGS. 1 and 2 may be replaced with other elements that may serve the same or a substantially similar purpose with the respective elements they serve to replace without departing from the scope of the sensor apparatus 110 according to the present disclosure.

The invention claimed is:

1. An optical sensor apparatus for determining at least one characteristic of a surface of an object positioned within a measurement range, the sensor apparatus comprising:

an illumination assembly comprising two or more light sources that are disposed at different positions with respect to an optical axis and a focal plane of a light-collecting optical assembly and configured to emit light towards the measurement range through the light-collecting optical assembly, wherein the emitted light from each of the two or more light sources covers the same predefined range of wavelengths and wherein the two or more light sources are configured to form respective two or more light emitting area patterns of predefined lateral shape;

a first optical assembly configured to longitudinally disperse the light emitted from the illumination assembly wherein light across the predefined range of wavelengths from each of the two or more light emitting area patterns is focused at a respective range of focus distances that corresponds to corresponding two or more sub-ranges of candidate distances within the measurement range at respective two or more measurement positions distributed at different positions in lateral direction;

a beam splitter configured to transmit the light emitted from the illumination assembly towards the first optical assembly and to fold the light reflected from the surface of the object and received through the first optical assembly;

a second optical assembly configured to receive the folded light across the predefined range of wavelengths, laterally disperse the received light across the predefined range of wavelengths and to focus the laterally dispersed light across the predefined range of wavelengths at a predefined distance;

a light sensor assembly having a sensor plane configured at the predefined distance to receive the laterally dispersed light across the predefined range of wavelengths such that the light originating from the two or more light emitting area patterns is received at respective two or more corresponding sub-ranges of positions along an axis on the sensor plane; and a detector assembly configured to determine the at least one characteristic of said surface of said object based on respective intensities of the laterally dispersed light received across said two or more sub-ranges of positions along said axis on the sensor plane.

2. The optical sensor apparatus according to claim 1, wherein the detector assembly is configured to determine one or more of the following based on one or more local intensity maxima of the laterally dispersed light across said two or more sub-ranges of positions along said axis on the sensor plane:

a distance to the surface of said object, an optical characteristic of the surface of the object.

3. The optical sensor apparatus according to claim 2, wherein the detector assembly is configured to determine the distance to the surface of the object in one or more of said two or more measurement positions via identifying those two or more candidate distances that respectively correspond to respective positions of the two or more local intensity maxima of the laterally dispersed light within respective ones of said two or more sub-ranges of positions along said axis on the sensor plane.

4. The optical sensor apparatus according to claim 2, wherein the detector assembly is arranged to determine the distance to the surface of the object in one or more of said two or more measurement positions based on those two or more candidate distances that respectively correspond to those two or more wavelengths that correspond to respective positions of the two or more local intensity maxima of the laterally dispersed light within respective ones of said two or more sub-ranges of positions along said axis on the sensor plane.

5. The optical sensor apparatus according to claim 3, wherein the detector assembly is configured to:

identify respective positions of the two or more local intensity maxima across said two or more sub-ranges of positions along said axis on the sensor plane and to carry out the following for each of the identified positions;

identify the respective sub-range of positions along said axis within which the respective identified position resides;

select from respective predefined mappings between a sub-range of positions along said axis and a corresponding sub-range of candidate distances the one that pertains to the respective identified sub-range of positions; and apply the selected predefined mapping to identify that one of the candidate distances that corresponds to a relative position of the respective identified position within the identified sub-range of positions, thereby determining the distance to the surface of the object.

6. The optical sensor apparatus according to claim 1, wherein the predefined range of wavelengths spans over a band having a width in a range from 10 to 50 nanometers.

7. The optical sensor apparatus according to claim 1, wherein the predefined range of wavelengths is between 420 and 480 nanometers.

8. The optical sensor apparatus according to claim 2, wherein the detector assembly is configured to determine reflectivity of the surface of the object based on respective magnitudes of one or more local intensity maxima of the laterally dispersed light across said two or more sub-ranges of positions along said axis on the sensor plane.

9. The optical sensor apparatus according to claim 1, wherein said predefined lateral shape of the two or more light emitting area patterns comprises a point or a line.

10. The optical sensor apparatus according to claim 1, wherein the light emitted from the two or more light sources originates from one or more light emitting diodes.

11. The optical sensor apparatus according to claim 1, wherein said two or more light sources are provided via projecting light through a pinhole array or a slit array.

12. The optical sensor apparatus according to claim 1, wherein the first optical assembly comprises a focusing lens assembly configured to provide a predefined amount of longitudinal chromatic dispersion.

13. The optical sensor apparatus according to claim 1, wherein the second optical assembly comprises:

a dispersive optical component configured to receive the folded light across the predefined range of wavelengths from the beam splitter and to provide a predefined amount of lateral chromatic dispersion to the folded light across the predefined range of wavelengths; and a focusing optical assembly configured to focus the laterally dispersed light across the predefined range of wavelengths at the predefined distance.

14. The optical sensor apparatus according to claim 1, wherein the second optical assembly is configured to receive the folded light substantially in its entirety and provide the folded light received therein substantially in its entirety as the laterally dispersed light for reception at the sensor plane of the sensor assembly.

15. The optical sensor apparatus according to claim 1, wherein the light sensor assembly comprises an image sensor.

16. An optical measurement apparatus for determining surface characteristics of an object positioned within a measurement range, the measurement apparatus comprising:

an optical sensor apparatus according to claim 1, configured to determine at least one characteristic of a surface of said object; and a mechanism configured to change relative positions of the sensor apparatus and the object, wherein the measurement apparatus is configured to:

move the object with respect to the sensor apparatus to said plurality of positions according to a predefined movement pattern;

operate the sensor apparatus to determine said at least one characteristic of the surface of the object at said plurality of positions; and determine said surface characteristics of said object based on the respective at least one characteristic of the surface of said object determined at said plurality of positions.

17. The measurement apparatus according to claim 16, wherein said surface characteristics include a shape of the surface of said object and wherein the sensor apparatus is configured to determine a distance to the surface of said object based on respective positions of one or more local intensity maxima of the laterally dispersed light across said two or more sub-ranges of positions along said axis on the sensor plane.

18. The measurement apparatus according to claim 16, wherein said surface characteristics include a reflectivity of the surface of said object and wherein the sensor apparatus is configured to determine a reflectivity of the surface of said object based on respective magnitudes of one or more local intensity maxima of the laterally dispersed light across said two or more sub-ranges of positions along said axis on the sensor plane.

* * * * *